United States Patent [19]

Tokura et al.

[11] Patent Number: 4,587,843
[45] Date of Patent: May 13, 1986

[54] THERMOCOUPLE-TYPE GAS-FLOW MEASURING APPARATUS

[75] Inventors: Norihito Tokura, Aichi; Hisasi Kawai, Toyohashi; Kenji Kanehara, Aichi; Tokio Kohama, Nishio, all of Japan

[73] Assignee: Nippon Soken, Inc., Nishio, Japan

[21] Appl. No.: 622,554

[22] Filed: Jun. 20, 1984

[30] Foreign Application Priority Data

Jun. 23, 1983 [JP] Japan .................................. 58-113978

[51] Int. Cl.⁴ .............................................. G01F 1/68
[52] U.S. Cl. ................................................... 73/204
[58] Field of Search ........................................... 73/204

[56] References Cited

U.S. PATENT DOCUMENTS

| 2,197,818 | 4/1940 | Tozier | 73/204 |
| 2,594,618 | 4/1952 | Booth, Jr. | 73/202 X |
| 2,786,354 | 3/1957 | Martin et al. | 73/204 |
| 4,373,386 | 2/1983 | Schuddemat et al. | 73/204 X |
| 4,384,484 | 5/1983 | Kohama et al. | |
| 4,399,697 | 8/1983 | Kohama et al. | |
| 4,399,698 | 6/1983 | Hiromasa et al. | 73/204 |
| 4,478,077 | 10/1984 | Bohrer et al. | 73/204 |

Primary Examiner—Herbert Goldstein
Attorney, Agent, or Firm—Cushman, Darby & Cushman

[57] ABSTRACT

A gas-flow measuring apparatus including a plurality of thermocouples formed in series on a substrate. Every other thermojunction of the thermocouples is located upstream of an electric heater, while the remaining thermojunctions of the thermocouples are located downstream of the electric heater.

8 Claims, 3 Drawing Figures

THERMOCOUPLE-TYPE GAS-FLOW MEASURING APPARATUS

BACKGROUND OF THE INVENTION

1. Field of the Invention

The present invention relates to a gas-flow measuring apparatus which is used, for example, for measuring the flow rate of engine intake air.

2. Description of the Prior Art

Generally, in an internal combustion engine, the amount of intake air is one of the most important driving parameters for controlling the base fuel injection amount, base ignition timing, and the like. A gas-flow measuring apparatus, i.e., an airflow meter, is provided for this purpose.

One of the more common prior art airflow meters is the hot-wire type. For example, the hot-wire-type airflow meter may consist of an electric heater provided in an intake-air passage of an engine and temperature-dependent resistors arranged before and after the electric heater, the electric heater and the temperature-dependent resistors being made of platinum wires of the same characteristics floating in the gas stream. In this type of airflow meter, however, the hot-wires are easily broken due to vibration, shock, and the like, especially due to engine backfires.

In order to generate a voltage corresponding to the flow rate of air, two fixed resistors are connected to the temperature-dependent resistors, thereby forming a bridge circuit. The difference in potential between the diagonal points of the bridge circuit is amplified and fed back to the electric heater. In this case, however, it is necessary to remarkably reduce the difference in temperature coefficient between the fixed resistors and the temperature-dependent resistors. For this purpose, additional steps for adjustment are necessary, increasing the manufacturing cost.

SUMMARY OF THE INVENTION

It is an object of the present invention to provide a gas-flow measuring apparatus having good resistance to vibration, shock, and the like and having low manufacturing cost.

According to the present invention, a plurality of thermocouples are formed in series on a substrate. Every other thermojunction of the thermocouples is located upstream of an electric heater, while the remaining thermojunctions of the thermocouples are located downstream of the electric heater.

Since the apparatus of the present invention uses no hot-wires, high resistance to vibration, shock, and the like can be obtained. Further, no bridge circuit is necessary, thus achieving a low manufacturing cost.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1:
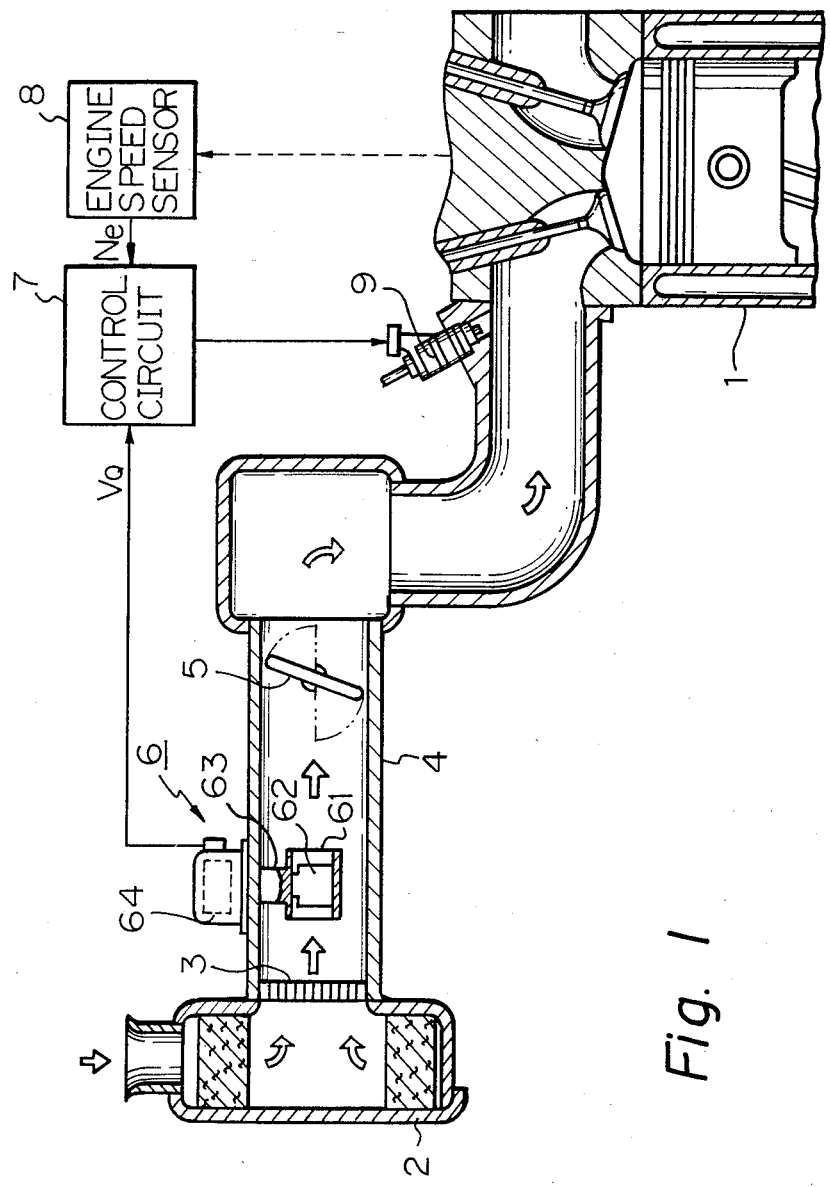
FIG. 1 is a schematic diagram the overall configuration of an internal combustion engine including a gas-flow measuring apparatus according to the present invention.

In FIG. 1, which illustrates the overall configuration of an internal combustion engine including a gas-flow measuring apparatus according to the present invention, reference numeral 1 designates a spark ignition engine for driving an automobile in which air for combustion is sucked through an air cleaner 2, a rectifier grid 3 for making the air flow uniform, and an intake air passage 4. Provided in the intake air passage 4 is a throttle valve 5 arbitrarily operated by a driver. The gas-flow measuring apparatus is provided in the intake air passage 4 between the rectifier grid 3 and the throttle valve 5 and bears the reference numeral 6.

The gas-flow measuring apparatus 6 comprises a conduit 61 in which a sensing portion 62 is mounted, a supporting member 63 for supporting the conduit 61 in the intake air passage 4, and a sensing circuit 64 fixed to the back of the supporting member 63. In this case, the conduit 61 is parallel to the air stream of the intake air passage 4.

An output voltage $V_Q$ of the sensing circuit 62 is supplied to a control circuit 7 which is comprised of, for example, a microcomputer. The control circuit 7 also receives various kinds of detection signals such as an engine speed signal $N_e$ from an engine speed sensor 8. The engine speed sensor 8 is mounted on a distributer or a camshaft (not shown). Based upon the signals $V_Q$ and $N_e$, the control circuit 7 controls the valve opening time of a fuel injection valve 9.

Figure 2:
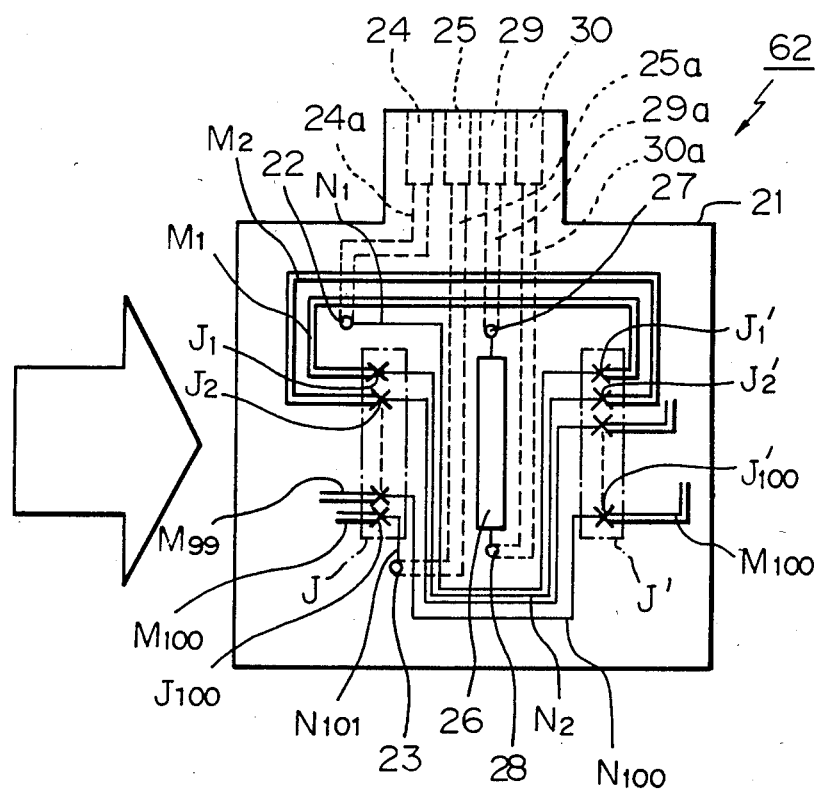
FIG. 2 is an elevation view of the gas-flow measuring apparatus of FIG. 1.

In FIG. 2, which illustrates the configuration of the sensing portion 62 of FIG. 1, reference numeral 21 designates a substrate which is, for example, ceramic of about 0.2 mm thickness. Formed by vacuum deposition on the substrate 21 are thin platinum deposits $M_1$ through $M_{100}$. Also formed by the vacuum deposition on the substrate 21 are thin platinum-rhodium deposits $N_1$ through $N_{101}$. Note that platinum has a different thermoelectromotive force from that of platinum-rhodium.

The thin platinum deposits $M_1$ through $M_{100}$ and the platinum-rhodium thin deposits $N_1$ through $N_{101}$ are alternatingly connected in series at thermojunctions $J_1$ through $J_{100}$ and thermojunctions $J'_1$ through $J'_{100}$. For example, the thin platinum deposit $M_1$ and the thin platinum-rhodium deposit $N_1$ are combined at the thermojunction $J'_1$, thereby forming one thermocouple. Similarly, the thin platinum deposit $M_1$ and the thin platinum-rhodium deposit $N_2$ is combined at the thermojunction $J_1$, thereby forming another thermocouple.

The end of the thin platinum-rhodium deposit $N_1$ is connected via a throughhole 22 and a gold connection 24a to a terminal 24 on the back of the substrate 21. On the other hand, the end of the thin platinum-rhodium deposit $N_{101}$ is connected via a throughhole 23 and a gold connection 25a to a terminal 25 on the back of the substrate 21.

Reference numeral 26 designates a thin platinum deposit which has one end connected via a throughhole 27 and a gold connection 29a to a terminal 29 on the back of the substrate 21 and another end connected via a throughhole 28 and a gold connection 30a to a terminal 30 on the back of the substrate 21. The thin platinum deposit 26 serves as an electric heater.

A first group of thermojunctions $J_1$ through $J_{100}$ is located at the upstream side of the heater, while a second group of thermojunctions $J'_1$ through $J'_{100}$ is located at the downstream side of the heater.

Note that the surface of the substrate 62 other than the terminals 24, 25, 29, and 30 is covered by a 1 μm thick coating of silicon nitride.

In the sensing portion 62 of FIG. 2, when power is supplied to the terminals 29 and 30, the thin platinum deposit 26 generates heat. In this state, when the air flows as indicated by an arrow, the original air affects the first thermojunctions $J_1$ through $J_{100}$, and the air heated by the heater affects the second group of the thermojunctions $J'_1$ through $J'_{100}$. As a result, there is a difference in temperature between the first group of thermojunctions $J_1$ through $J_{100}$ and the second group of thermojunctions $J'_1$ through $J'_{100}$. Such a difference in temperature generates a thermoelectromotive force in each thermocouple. For example, in the case of a thermocouple having a thermojunction formed by platinum and platinum-rhodium (10% Rh), the thermocouple generates a voltage of 0.00645 mV per 1° C. Therefore, if one hundred of such thermocouples are connected in series, a voltage of 0.645 mV per 1° C. is generated.

Figure 3:
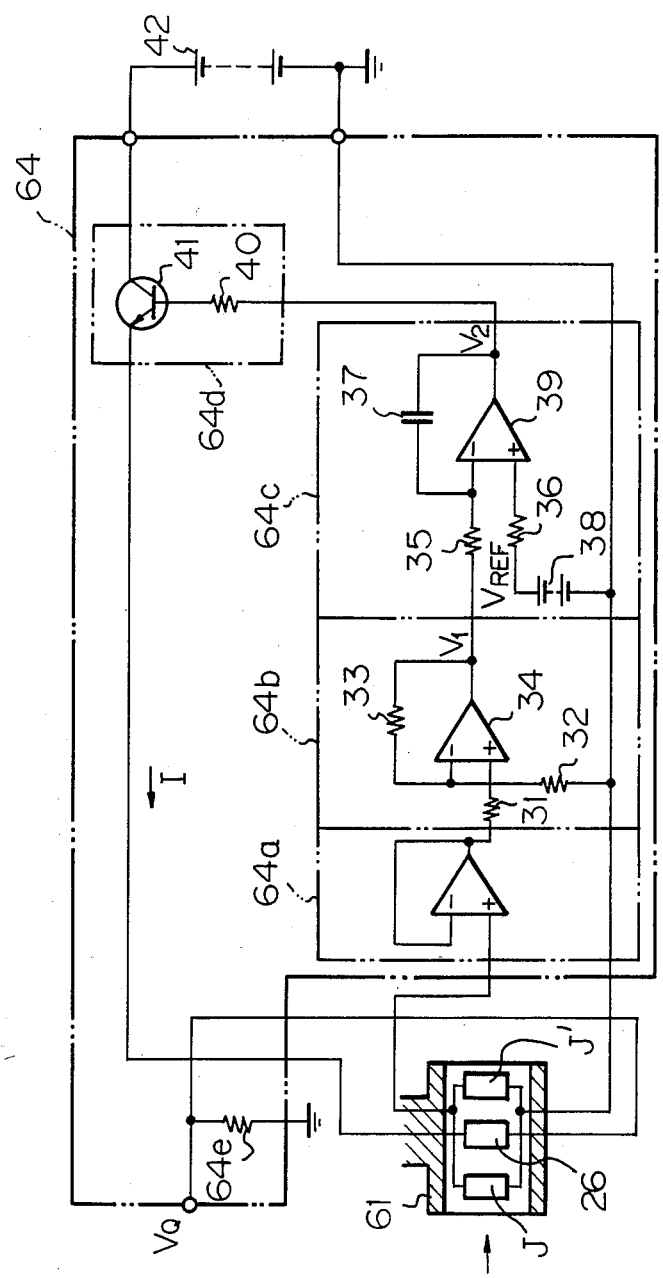
FIG. 3 is a circuit diagram of the sensing circuit of FIG. 1.

Referring to FIG. 3, the sensing circuit 64 comprises a voltage buffer 64a, an amplifier circuit 64b, a differential amplifier 64c, a power amplifier 64d, and an output resistor 64e. Note that reference J illustrates schematically all of the first group of thermojunctions $J_1$ through $J_{100}$, and J' illustrates schematically all of the second group of thermojunctions $J'_1$ through $J'_{100}$.

The amplifier 64b comprises an input resistor 31, a ground resistor 32, a negative feedback resistor 33, and an operational amplifier 34. The amplifier 64b amplifies the output of the buffer 64a.

The differential amplifier 64c comprises input resistors 35 and 36, a capacitor 37, a reference voltage source 38 for generating a reference voltage $V_{REF}$, and an operational amplifier 39. The differential amplifier 64c amplifies the difference in potential between the output voltage of the amplifier 64b and the reference voltage $V_{REF}$ of the reference voltage source 38. The capacitor 37 serves to prevent oscillation of the amplifier 64c.

The power amplifier 64d comprises a resistor 40 and a power transistor 41 which is supplied with power by a battery 42. The power amplifier 64d amplifies the output voltage of the differential amplifier 64c and supplies an output voltage to the electric heater indicated by 26.

The output resistor 64e is used to supply the voltage $V_Q$ indicating the amount of air flowing through the air intake passage 4 (FIG. 1).

The principle of the gas-flow measuring apparatus 6 of FIGS. 1, 2, and 3 will now be explained. The intake air amount determined by the opening of the throttle 5 is sucked from the air cleaner 2 via the rectifier grid 3 into the engine 1. Simultaneously, a definite amount of the air passes through the gas passage 61. In this state, the first thermojunction group J on the upstream side is affected only by the temperature of the gas stream, and the second thermojunction group J' on the downstream side is affected by the heat amount generated by the heater in addition to the temperature of the gas stream, i.e., the temperature of the heated gas stream. As a result, the following difference ΔT in temperature between the first and second thermojunction groups J and J' is generated:

$$K_1 \cdot \Delta T = P/G \quad (1)$$

where P is the power supplied to the heater 26;
G is the rate of air flow (g/s); and
$K_1$ is a constant. In addition, the relationship between the total electromotive force ΔV of the thermocouples connected in series and the difference ΔT in temperature is as follows:

$$\Delta T = K_2 \cdot \Delta V \quad (2)$$

where $K_2$ is constant. Therefore, from equations (1) and (2), $$K_3 \Delta V = P/G \quad (3)$$

where $K_3$ is a constant. As a result, if the total electromotice force ΔV of the thermocouples connected in series is held constant by the sensing circuit 64, $$G = K_4 \cdot P \quad (4)$$

where $K_4$ is a constant.

Here, assume that the resistance value of the output resistor 64e is smaller as compared with the resistance value of the heater 26, $$P = K_5 \cdot I^2 \quad (5)$$

where I is the current flowing through the heater 26 and $K_5$ is a constant. Therefore, $$G = K_6 \cdot I^2 \quad (6)$$

where $K_6$ is a constant.

Further, asssume that the resistance value of the output resistor 64e is held constant regardless of the change of temperature, $$G = K V_Q^2 \quad (7)$$

where K is a constant.

As explained above, the sensing circuit 64 controls the current I flowing through the heater 26, so that the total electromotive force ΔV is held constant. That is, when the intake air amount is increased, the increase of temperature of the intake air by the heater 26 is reduced. Accordingly, the difference ΔT in temperature, i.e., the electromotive force ΔV, is reduced. As a result, the output voltage $V_1$ of the amplifier 64b is reduced, thereby increasing the output voltage $V_2$ of the differential amplifier 64c. Here, $V_2 = \alpha(V_{REF} - V_1)$ (α: constant) is satisfied. Therefore, the power amplifier 64d increases the power current I so as to increase the heat generated by the heater 26.

Thus, as the difference ΔT in temperature increases, the output voltage $V_1$ of the amplifier 64b conforms to the reference voltage $V_{REF}$, thereby obtaining an equilibrium state of the operation of the sensing circuit 64.

Contrary to the above, when the intake air amount is decreased, the increase of temperature of the intake air by the heater 26 is remarkable. Accordingly, the difference ΔT in temperature, i.e., the electromotive force ΔV is increased. As a result, the output voltage $V_1$ of the amplifier 64b is increased, thereby decreasing the output voltage $V_2$ of the differential amplifier 64c. Therefore, the power amplifier 64d decreases the power current I so as to decrease the heat generated by the heater 26.

Thus, as the difference $\Delta T$ in temperature decreases, the output voltage $V_1$ of the amplifier 64b conforms to the reference voltage $V_{REF}$, thereby obtaining an equilibrium state of the operation of the sensing circuit 64.

The output voltage $V_Q$ of the output resistor 64e is supplied to the control circuit 7, which linearizes the voltage $V_Q$.

In the above-mentioned embodiment, nickel chromium, having no temperature coefficient, can be used as the heater instead of the platinum deposit. In this case, the output resistor 64e is unnecessary and the output voltage $V_Q$ is obtained at the terminal of the heater. In addition, equation (7) is replaced by:

$$G = K' V_Q^2$$

where $K' = K/R$ and R is the resistance value of the nickel chromium.

Also, it is possible to use a mica plate instead of the ceramic substrate 21 of FIG. 2. Further, materials other than platinum and platinum-rhodium can be used.

Still further, the number of thermocouples of the sensing portion 62 can be changed in accordance with need. However, the maximum number of thermocouples is limited by the fine lithography technology.

We claim:

1. An apparatus for measuring the flow rate of gas through a gas passage, comprising:
   a plate substrate disposed within said gas passage and parallel to the gas stream thereof;
   a thin film heater, formed on one surface of said plate substrate, for heating the gas flowing therethrough;
   a plurality of first conductive thin film layers formed on said one surface of said plate substrate, each of said first conductive thin film layers being separated electrically from each other and having ends at the upstream and downstream of said thin film heater with respect to the direction of gas flow;
   a plurality of second conductive thin film layers formed on said one surface of said plate substrate, each of said second conductive thin film layers being separated electrically from each other and said first conductive thin film layers and having ends at the upstream and downstream of said thin film heater with respect to the direction of gas flow;
   a plurality of upstream thermojunctions serially connecting said ends of said first conductive thin film layers at the upstream of said thin film heater with said ends of said second conductive thin film layers at the upstream of said thin film heater;
   a plurality of downstream thermojunctions serially connecting said ends of said first conductive thin film layers at the downstream of said thin film heater with said ends of said second conductive thin film layers at the downstream of said thin film heater;
   said upstream thermojunctions and said downstream thermojunctions being connected in series so that a total of upstream electromotive forces generated by said upstream thermojunctions in accordance with the temperature of the gas on the upstream side of said thin film heater and downstream electromotive forces generated by said downstream thermojunctions in accordance with the temperature of the gas on the downstream side of said thin film heater is generated; and
   an electric circuit means, connected to said thin film heater and said first and second conductive thin film layers, for controlling electric power supplied to said thin film heater in accordance with said total of said upstream electromotive forces and downstream electromotive forces,
   wherein said first conductive thin film layers extend outwardly from respective ends thereof and bypass one end of said thin film heater, and said second conductive film layers extend inwardly from respective ends thereof and bypass the other end of said thin film heater so that crossing of said first conductive thin film layers with said second conductive thin film layers is prevented.

2. An apparatus as set forth in claim 1, wherein said thin film heater comprises a platinum deposit.

3. An apparatus as set forth in claim 1, wherein said first conductive thin film layers comprise platinum deposits and said second conductive layers comprises platinum alloy deposits.

4. An apparatus as set forth in claim 1, wherein said plate substrate comprises a ceramic substrate.

5. An apparatus as set forth in claim 1, wherein said substrate comprises a mica plate.

6. An apparatus as set forth in claim 1, wherein said electric circuit means comprises:
   an amplifier means, connected to said first and second conductive layers in series, for amplifying the total electromotive force thereof;
   a differential amplifier, connected to the output of said amplifier means, for differentially amplifying the difference in potential between the output voltage of said amplifier means and a first reference voltage;
   a power amplifier, connected to said second differential amplifier, for power amplifying the output voltage of said differential amplifier so as to apply voltage to said thin film heater; and
   a resistor, connected to said thin film heater, for generating voltage corresponding to said flow rate.

7. An apparatus as set forth in claim 1, wherein said thin film heater has no substantial temperature coefficient.

8. An apparatus as set forth in claim 1, wherein said circuit means comprises:
   an amplifier means, connected to said first and second conductive thin film layers in series, for amplifying the total electromotive force thereof;
   a differential amplifier, connected to the output of said amplifier means, for differentially amplifying the difference in potential between the output voltage of said amplifier means and a first reference voltage; and
   a power amplifier, connected to said second differential amplifier, for power amplifying the output voltage of said differential amplifier so as to apply voltage to said thin film heater;
   said thin film heater generating a voltage corresponding to said flow rate.

* * * * *